United States Patent
McCormick

(10) Patent No.: US 9,849,520 B2
(45) Date of Patent: Dec. 26, 2017

(54) INVERTED PILOTED COLLET CHUCK AND APPLICATIONS THEREOF

(71) Applicant: Kennametal Inc., Latrobe, PA (US)

(72) Inventor: Michael R. McCormick, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 116 days.

(21) Appl. No.: 14/825,461

(22) Filed: Aug. 13, 2015

(65) Prior Publication Data

US 2017/0043412 A1 Feb. 16, 2017

(51) Int. Cl.
*B23B 31/20* (2006.01)
*B23B 31/02* (2006.01)

(52) U.S. Cl.
CPC .............. *B23B 31/20* (2013.01); *B23B 31/02* (2013.01); *B23B 2231/2078* (2013.01); *Y10T 279/17495* (2015.01); *Y10T 409/303752* (2015.01)

(58) Field of Classification Search
CPC .................. B23B 31/20; B23B 31/201; B23B 2231/2078; Y10T 279/17495; Y10T 409/303752; Y10T 279/17299; Y10T 279/17341; Y10T 279/17504
See application file for complete search history.

(56) References Cited

U.S. PATENT DOCUMENTS

| 559,943 | A | * | 5/1896 | Kent | B23B 31/208 279/47 |
|---|---|---|---|---|---|
| 1,185,762 | A | * | 6/1916 | Bohlig | A63D 15/14 144/205 |
| 2,458,889 | A | * | 1/1949 | Bloomquist | B23B 31/202 279/47 |
| 2,465,837 | A | * | 3/1949 | Benjamin | B23B 31/201 279/158 |
| 2,491,167 | A | * | 12/1949 | Drew | B23B 31/202 279/105.1 |
| 3,246,903 | A | * | 4/1966 | Sattler | B23B 31/202 279/47 |
| 3,547,454 | A | * | 12/1970 | Benjamin | B23B 31/208 279/47 |
| 3,556,540 | A | * | 1/1971 | Benjamin | B23B 31/202 279/47 |
| 3,677,560 | A | * | 7/1972 | Clarkson | B23B 31/208 279/105.1 |
| 3,727,928 | A | * | 4/1973 | Benjamin | B23B 31/208 279/133 |

(Continued)

FOREIGN PATENT DOCUMENTS

| DE | 1477757 A1 * 10/1969 | ............. B23B 31/20 |
|---|---|---|
| DE | 202015101722 U1 * 4/2015 | ........... B23B 31/201 |

(Continued)

*Primary Examiner* — Eric A Gates
(74) *Attorney, Agent, or Firm* — Matthew S. Bedsole

(57) ABSTRACT

Collet chucks are described herein having design and architecture for minimizing and/or mitigating collet misalignment during rotary tool coupling operations. For example, a collet chuck comprises a housing for connection and rotation with a spindle about an axis of rotation, wherein the housing defines a socket for receiving a collet. The collet comprises a nose end engaging the socket and a second tapered end engaging a locknut assembly.

16 Claims, 2 Drawing Sheets

(56) References Cited

U.S. PATENT DOCUMENTS

| | | | | |
|---|---|---|---|---|
| 4,496,163 A * | 1/1985 | Bernfeld | ............... | B23B 31/202 |
| | | | | 279/145 |
| 4,725,064 A * | 2/1988 | Glimpel | ................ | B23B 31/202 |
| | | | | 279/46.2 |
| 5,340,127 A * | 8/1994 | Martin | .................. | B23B 31/201 |
| | | | | 279/157 |
| 5,975,817 A * | 11/1999 | Komine | ............... | B23B 31/001 |
| | | | | 279/20 |
| 7,549,953 B2 * | 6/2009 | Walters | ................... | B23B 31/20 |
| | | | | 279/143 |
| 2008/0224424 A1* | 9/2008 | Chen | ..................... | B23B 31/201 |
| | | | | 279/47 |
| 2015/0202692 A1* | 7/2015 | Lin | ....................... | B23B 31/201 |
| | | | | 279/62 |

FOREIGN PATENT DOCUMENTS

| | | |
|---|---|---|
| GB | 551720 | 3/1943 |
| GB | 2170125 A | 7/1986 |
| JP | H0623608 A | 2/1994 |
| WO | 9302822 | 2/1993 |

* cited by examiner

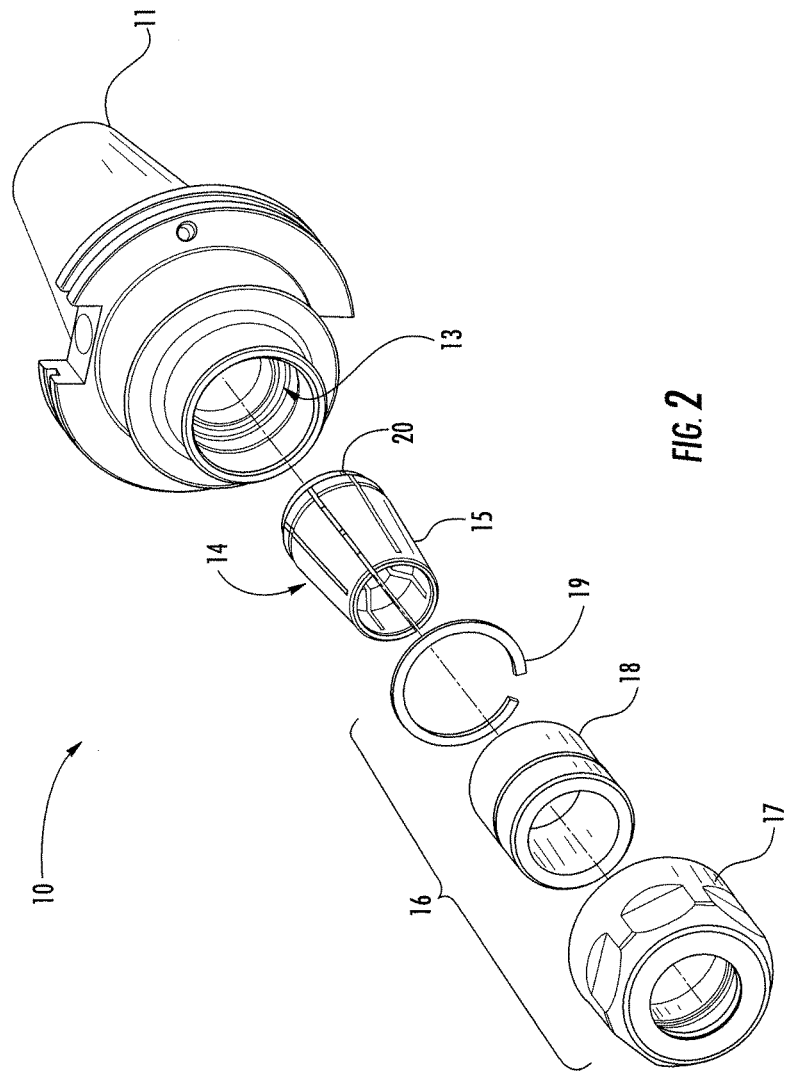

INVERTED PILOTED COLLET CHUCK AND APPLICATIONS THEREOF

FIELD

The present invention relates to rotary tool coupling apparatus and, in particular, to collet chucks having an inverted orientation.

BACKGROUND

A collet is generally received in a tapered bore of a chuck body, the collet being formed with a correspondingly tapered external surface enabling radial contraction when the collet is forced axially into the tapered bore. Conventionally, tapering of the chuck body and collet external surface proceed in the spindle direction, enabling a wide opening for insertion of the collet into the chuck bore. Moreover, this taper naturally centralizes the portion of the collet within the chuck bore. The remaining portion of the collet not within the tapered bore can be pushed from the central axis due to non-isotropic application of force resulting from the locknut threads, the locknut collet support angle and/or the collet being twisted as the locknut is tightened. Such misalignment from the central axis is translated to the rotary cutting tool producing unacceptable runout and/or vibrations that can damage the cutting tool and workpiece.

SUMMARY

In view of these problems, collet chucks are described herein having design and architecture operable to minimize and/or mitigate collet misalignment during rotary tool coupling operations. For example, a collet chuck comprises a housing for connection and rotation with a spindle about an axis of rotation, wherein the housing defines a socket for receiving a collet. The collet comprises a nose end engaging the socket and a second tapered end engaging a locknut assembly. As illustrated in the figures herein, the nose end engaging the socket results in an inverted orientation of the collet. The locknut assembly comprises a locknut threadingly engaging the housing for collapsing the collet. In some embodiments, the locknut assembly further comprises a pilot clamping ring positioned within a bore of the locknut at a first radial clearance. The pilot clamping ring engages the second tapered end of the collet and is positioned within a cylindrical inner surface of the housing at a second radial clearance. Compressive force applied by a collar of the locknut is transmitted through the pilot clamping ring collapsing the collet.

In another aspect, methods of machining a workpiece are described herein. In some embodiments, a method comprises providing a collet chuck including a housing for connection and rotation with a spindle about an axis of rotation, the housing defining a socket for receiving a collet. The collet comprises a nose end engaging the socket and a second tapered end for receiving a shank of a cutting tool in a central bore of the collet. A cutting tool is positioned in the collet central bore, and the central bore is collapsed by tightening a locknut assembly comprising a locknut threadingly engaging the housing. A pilot clamping ring, in some embodiments, is positioned within a bore of the locknut at a first radial clearance. The pilot clamping ring engages the second tapered end of the collet and is positioned within a cylindrical inner surface of the housing at a second radial clearance. Compressive force applied by a collar of the locknut is transmitted through the pilot clamping ring collapsing the collet.

These and other embodiments are further described in the following detailed description.

BRIEF DESCRIPTION OF THE DRAWINGS

FIG. 2 is an exploded view of a collet chuck according to one embodiment described herein.

DETAILED DESCRIPTION

Figure 1:
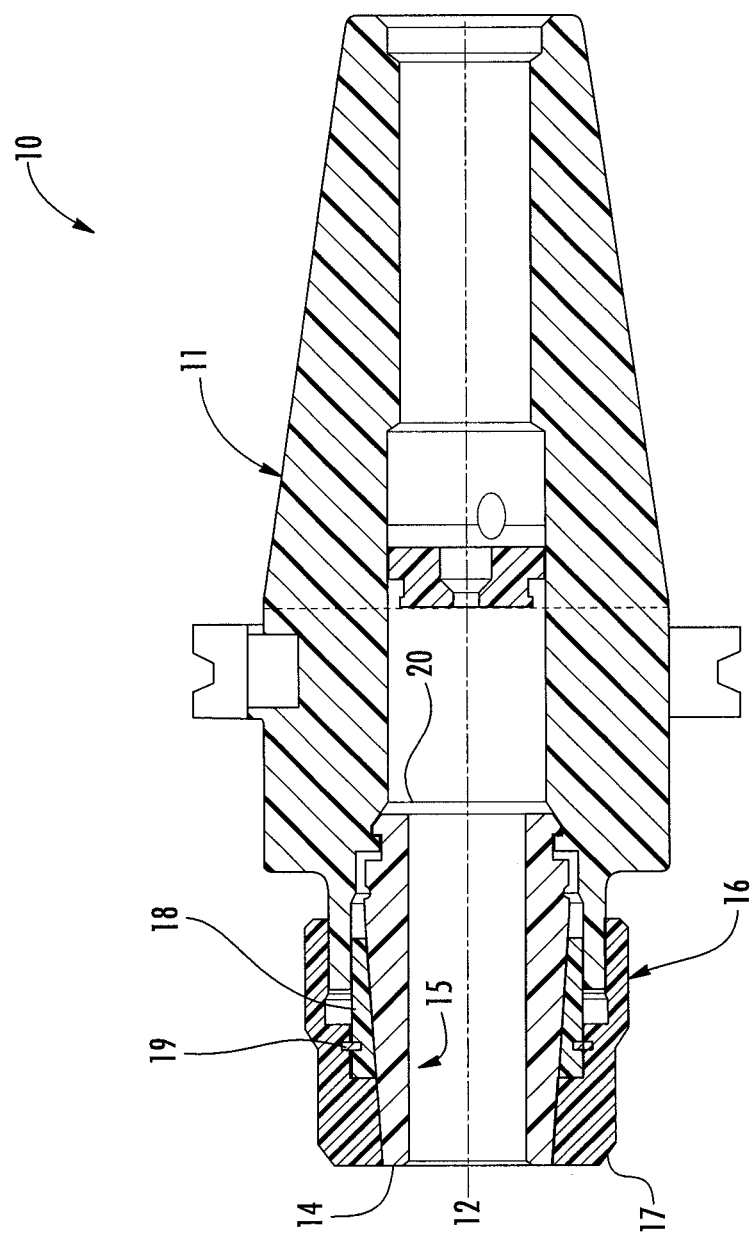
FIG. 1 illustrates a cross-sectional view of a collet chuck according to one embodiment described herein.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

With reference to the non-limiting embodiments of FIGS. 1 and 2, a collet chuck is described. As illustrated in FIGS. 1 and 2, the collet chuck (10) includes a housing (11) for connection and rotation with a spindle about an axis of rotation (12). The housing defines a socket (13) for receiving the collet (14). The socket (13) has geometry and dimensions for receiving and engaging the nose end (20) of the collet (14), such as the nose end of an ER-style or TG-style collet. Insertion of the nose end (20) into the socket (13) provides the collet (14) an inverted orientation relative to traditional collet chucks where the nose end (20) of the collet remains outside the socket (13). The inverted orientation provides a second tapered end (15) of the collet (14) for engagement with the locknut assembly (16). The locknut assembly (16) comprises a locknut (17) threadingly engaging the housing (11) for application of axial force to collapse the collet (14).

In the embodiments of FIGS. 1 and 2, the locknut assembly (16) further comprises a pilot clamping ring (18) positioned within a bore of the locknut (17) at a first radial clearance. A snap ring (19) can be employed to retain the pilot clamping ring (18) in the locknut bore. The pilot clamping ring (18) engages the second tapered end (15) of the collet (14) and is positioned within a cylindrical inner surface of the housing (11) at a second radial clearance. The pilot clamping ring (18) can center the collet (14), and compressive force applied by a collar of the locknut (17) is transmitted through the pilot clamping ring (18) collapsing the collet (14). The first radial clearance permits free rotation of the pilot clamping ring (18) within the locknut (17). Similarly, the second radial clearance permits free rotation of the pilot clamping ring (18) within the housing (11). Therefore, inaccuracies effected due to the threads of the locknut (17) pushing the collet (14) out of alignment within the socket (13) are mitigated or eliminated. The pilot clamping ring (18) can be fabricated from any material not inconsistent with the objectives of the present invention. In some embodiments, for example, the pilot clamping ring is metal or alloy. Alternatively, the pilot clamping ring (18) can be a polymeric material or polymeric composite material operable to meet the mechanical demands of the collet chuck.

FIG. 2 is an exploded view of a collet chuck of FIG. 1. As illustrated in FIG. 2, the nose end (20) of the collet (14) is inserted into the socket (13) of the housing (11), leaving the second tapered end (15) outside the socket (13) for engagement with the locknut assembly (16). The pilot clamping ring (18) engages the second tapered end (15) of the collet (14) and is positioned within a bore of the locknut (17) at the first radial clearance. A snap ring (19) retains the pilot clamping ring (18) within the locknut (17). In some embodiments, a nose ring (not shown) can reside between the locknut collar and the pilot clamping ring (18). Use of the nose ring can permit additional gripping force to be applied by the collet. In some embodiments, for example, the nose ring can have a ball-bearing architecture. Alternatively, the pilot clamping ring (18), in some embodiments, can extend to the locknut collar, thereby also serving as a nose ring.

ER and TG-style collets can be employed in collet chucks described herein. In some embodiments, a collet chuck described herein employing an ER or TG-style collet can exhibit a runout error less than 0.010 mm according to DIN6499. In some embodiments, the collet chuck has a runout error selected from Table I.

TABLE I

| Collet Chuck Runout Error (mm) - DIN6499 |
|---|
| ≤0.008 |
| ≤0.005 |
| ≤0.004 |
| 0.002-0.010 |

Collet chucks having architectures described herein can also provide desirable levels of gripping force. For example, in some embodiments, a collet chuck described herein employing an ER-style collet can exert grip strength of at least 1800 in/lb at an applied torque of 100 ft/lb. In some embodiments, such a collet chuck can exert grip strength of at least 2500 in/lb at an applied torque of 100 ft/lb. Further, a collet chuck having architecture described herein can exert grip strength of 1800 in/lb. to 2800 in/lb. in some embodiments.

In another aspect, methods of machining a workpiece are described herein. In some embodiments, a method comprises providing a collet chuck including a housing for connection and rotation with a spindle about an axis of rotation, the housing defining a socket for receiving a collet. The collet comprises a nose end engaging the socket and a second tapered end for receiving a shank of a cutting tool in a central bore of the collet. The shank of a cutting tool is positioned in the collet central bore, and the central bore is collapsed by tightening a locknut assembly comprising a locknut threadingly engaging the housing. A pilot clamping ring, in some embodiments, is positioned within a bore of the locknut at a first radial clearance. The pilot clamping ring engages the second tapered end of the collet and is positioned within a cylindrical inner surface of the housing at a second radial clearance. Compressive force applied by a collar of the locknut is transmitted through the pilot clamping ring collapsing the collet.

In some embodiments, the collet chuck has an architecture as illustrated in FIGS. 1 and 2 described above. Further, any rotary cutting tool not inconsistent with the objectives of the present invention can be coupled with the collet chuck for workpiece machining. For example, endmills and drills can be secured by collet chucks described herein for various machining applications.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A collet chuck comprising: a housing for connection and rotation with a spindle about an axis of rotation, the housing defining a socket; and a collet comprising a nose end engaging the socket and a second tapered end engaging a locknut assembly comprising a locknut; wherein the nose end of the collet has a tapered portion which decreases in diameter in the direction of the nose end; and wherein the socket has an interior tapered portion which engages the tapered portion of the nose end of the collet, the interior tapered portion having a complementary taper angle to the tapered portion of the nose end of the collet; wherein the locknut assembly further comprises a pilot clamping ring positioned within a bore of the locknut at a first radial clearance, wherein the pilot clamping ring engages the second tapered end of the collet and is positioned within a cylindrical inner surface of the housing at a second radial clearance.

2. The collet chuck of claim 1, wherein the locknut assembly comprises a locknut threadingly engaging the housing.

3. The collet chuck of claim 1, wherein compressive force applied by a collar of the locknut is transmitted through the pilot clamping ring collapsing the collet.

4. The collet chuck of claim 1, wherein the pilot clamping ring freely rotates in the locknut bore.

5. The collet chuck of claim 1, wherein the collet is selected from the group consisting of an ER-style collet and TG-style collet.

6. The collet chuck of claim 5 providing a runout error of less than 0.010 mm according to DIN6499.

7. The collet chuck of claim 5 providing a runout error of less than 0.005 mm according to DIN6499.

8. The collet chuck of claim 1, wherein the locknut assembly further comprises a snap ring positioned between the locknut and pilot clamping ring.

9. The collet chuck of claim 1, wherein the collet is an ER-style collet, the collet chuck having a grip strength greater than 1800 in/lb at an applied torque of 100 ft/lb.

10. A method of clamping a tool comprising: providing a collet chuck including a housing for connection and rotation with a spindle about an axis of rotation, the housing defining a socket and a collet having a nose end engaging the socket and a second tapered end for receiving a shank of a cutting tool in a central bore of the collet; positioning the cutting tool shank in the collet central bore; and collapsing the central bore by tightening a locknut assembly comprising a locknut engaging the housing, wherein the nose end of the collet has a tapered portion which decreases in diameter in the direction of the nose end; wherein the socket has an interior tapered portion which engages the tapered portion of the nose end of the collet, the interior tapered portion having a complementary taper angle to the tapered portion of the nose end of the collet: and wherein the locknut assembly further comprises a pilot clamping ring positioned within a bore of the locknut at a first radial clearance, wherein the pilot clamping ring engages the second tapered end of the collet and is positioned within a cylindrical inner surface of the housing at a second radial clearance.

11. The method of claim 10, wherein the locknut threadingly engages the housing.

12. The method of claim 10, wherein the pilot clamping ring freely rotates in the locknut bore.

13. The method of claim 10, wherein the collet is selected from the group consisting of an ER-style collet and TG-style collet.

14. The method of claim 10, wherein the locknut assembly further comprises a snap ring positioned between the locknut and pilot clamping ring.

15. The method of claim 10, wherein the collet is an ER-style collet, the collet chuck having a grip strength greater than 1800 in/lb at an applied torque of 100 ft/lb.

16. The method of claim 10, wherein the cutting tool is a drill or an endmill.

* * * * *